Patented June 12, 1934

1,962,930

UNITED STATES PATENT OFFICE 1,962,930

PASTE OF POLYMERIZED VINYL ESTERS

Willy O. Herrmann and Wolfram Haehnel, Munich, Germany, assignors to Consortium für Elektrochemische Industrie, G. m. b. H., Munich, Germany, a corporation of Germany No Drawing. Application December 12, 1930, Serial No. 502,001. In Germany December 14, 1929

7 Claims. (Cl. 106—22)

Polymerized vinyl esters slightly soluble in alcohols are known, for instance modifications of the polymerized vinyl acetate which are not soluble in alcohols. In U. S. Patent 1,241,738 alcohol is mentioned as a precipitant for the polymerized vinyl acetate manufactured according to this patent. More specifically the highly viscous and highly polymerized modifications are slightly soluble or insoluble in alcohols. Therefore their application in the manufacture of lacquers, cements and so on is hindered for many purposes, for according to the art they cannot be applied for these purposes being insoluble in alcohol, the cheapest solvent. There exist also intermediates between the modifications insoluble in alcohols and the modifications disclosed in the United States Patent 1,710,825 which are soluble in alcohol. These intermediates can be dissolved in alcohols only by prolonged boiling. Therefore they can not be used for a profitable manufacture of solutions in alcohol.

We herein define such alcohol insoluble, or only difficultly soluble by prolonged boiling, polymerized vinyl esters, as completely polymerized vinyl esters, and disclaim from the scope of the claims herein, any processes or products wherein the polymerization is incomplete at the time of adding an alcohol, and further polymerization thereafter effected. We desire to cover herein only such processes and products wherein polymerization is completed and solution in a solvent other than an alcohol effected, before substituting such real solvent with an alcohol.

Now we have found a new process, by which modifications of polymerized vinyl esters selected from the group consisting of insoluble and slightly soluble polymerized vinyl esters can be made suitable for a profitable simple and quick dissolution in alcohol. This process is characterized by starting from the solutions of the modifications in real solvents other than alcohols and substituting the real solvent by alcohols. Suitable solutions are for instance the solutions in acetic ester, acetone, vinylacetate, and especially the products of complete polymerization of vinyl esters containing unchanged vinyl ester as a solvent or diluent. The process may be advantageously finished by separating out a layer enriched with polymerized vinyl ester by cooling.

The substitution of the solvent may be carried out by several methods, for instance by blowing through the solutions vapors of alcohols until the bulk of the nonalcoholic solvent is driven off or by adding an alcohol to the solution at a temperature of at least 20° C. and driving off afterwards the bulk of the nonalcoholic solvent or by any other similar method. For separating out a layer enriched with polymerized vinyl ester it is necessary to cool down the liquid advantageously under 20° C. In many cases this layer separates out at a temperature of about 17° C. but sometimes it is necessary to cool down to 0° C. and to still lower temperatures. The amount of cooling depends upon the nature of the solvents, for instance the purity of unchanged vinylester and of the remaining quantity of the solvent originally used.

From the pastes thus obtained solutions in alcohol are easily obtainable. These solutions in spirit are much more viscous than solutions of the polymerized vinyl acetate soluble in alcohol.

By this new and surprising process the good solvent is substituted by a typical nonsolvent in such a manner that to a certain degree it becomes a solvent.

The final concentration of the paste obtained by cooling the solution in alcohol depends upon the duration and the degree of cooling, the primary concentration and the like. The consistency of the paste may be varied according to the purposes within wide limits. The isolation of the separated paste from the surplus of solvent may be modified by many ways, for instance in kneading, stirring, whipping, pressing, centrifuging and so on.

The pastes of polymerized vinyl acetate insoluble or slightly soluble in alcohol may be for instance obtained in a concentration of 50 percent and more. Such concentrated pastes of stiff, jellylike consistency are suitable in an excellent manner for shipping. Solutions are readily obtainable from those pastes. Besides, the pastes are also more readily dissolved in the solvents typical for polymerized vinyl esters insoluble in alcohol than the pure solid polymerized vinyl esters.

The pastes may be modified afterwards by additions in different manners. For instance by adding organic solvents like acetone, butyl acetate, acetic ester, toluene, vinylacetate products may be manufactured which are more quickly dissolved in organic solvents. By such additions the separation of the pastes into two layers at low temperatures is prevented. This purpose is most perfectly achieved by addition of some water.

According to the invention alcohols suitable for the substitution of the solvents are all the aliphatic alcohols generally used as solvents for lacquers.

Example I 10 kg. of highly viscous polymerized vinyl acetate are dissolved in 40 kg. of acetic ester. Through this solution at the boiling point vapors of methylated spirit are blown until the bulk of the acetic ester is substituted by methylated spirit. The solution of polymerized vinyl acetate in alcohol thus obtained is cooled down to 15° C. About 20 kg. of a paste containing approximately 50 percent of polymerized vinyl acetate dissolved in alcohol is precipitated out. The separated alcohol is drawn off and may be used again in the process. The paste is readily dissolved by alcohol.

Example II

A mixture of 20 kg. of highly polymerized vinyl acetate and 80 kg. of vinylacetate is produced by polymerizing vinylacetate incompletely. The bulk of the unchanged vinylacetate is driven off by blowing through the solution vapors of crude alcohol overheated to about 100° C. The solution thus obtained is cooled down to 0° C. By thoroughly kneading the product in a kneading apparatus about 34 kg. of a paste containing approximately 60 percent of polymerized vinyl acetate dissolved in alcohol are obtained. The paste is readily dissolved by alcohol.

Example III

The paste obtained according to Example I is mixed with as much alcohol, acetone, acetic ester and water at 30° C. by stirring that the products obtained contains 40 percent of polymerized vinyl acetate, 55 percent of alcohol, 2 percent of acetone, 2 percent of acetic ester and 1 percent of water. The paste modified in this manner is still more quickly dissolved by alcohol and will not separate out any solvent even at low temperature.

While we have specifically described the preferred embodiment of our invention, it is to be understood that the invention is not to be limited to all of the details hereinbefore described, but may be otherwise varied within the scope of the following claims.

What we claim is:

1. Process for producing pastes easily soluble in solvents, especially in ethanol, from completely polymerized vinyl esters insoluble and slightly soluble in alcohols comprising starting from their solutions obtained with a real solvent which immediately dissolves the polymerized vinyl esters, displacing the real solvent of the original solution by treating with an alcohol vapor, and recovering alcohol soluble completely polymerized vinyl ester in the form of a paste.

2. Process for producing pastes easily soluble in solvents, especially in ethanol, from comcompletely polymerized vinyl esters insoluble and slightly soluble in alcohols comprising starting from their solutions obtained with a real solvent which immediately dissolves the polymerized vinyl esters, and displacing the real solvent of the original solution by an alcohol by blowing through the solution gaseous alcohol at a temperature of at least the boiling point of the alcohol.

3. Process for producing pastes easily soluble in solvents, especially in ethanol, from completely polymerized vinyl esters insoluble and slightly soluble in alcohols comprising starting from their solutions obtained with a real solvent which immediately dissolves the polymerized vinyl ester, displacing the real solvent of the original solution by alcohol by blowing through the solution gaseous alcohol at a temperature of at least the boiling point of the alcohol, and separating out a paste of completely polymerized alcohol soluble vinyl ester by cooling.

4. Process for producing pastes easily soluble in solvents, especially in ethanol, from completely polymerized vinyl acetate insoluble and slightly soluble in alcohols, comprising starting from their solutions obtained with vinyl acetate as the solvent and displacing the vinyl acetate of the original solution by alcohol by blowing through the original solution gaseous ethanol at a temperature of at least the boiling point of ethanol.

5. Process for producing pastes easily soluble in solvents, especially in ethanol, from completely polymerized vinyl acetate insoluble and slightly soluble in alcohols comprising starting from their solutions obtained with vinyl acetate as the solvent, displacing the vinyl acetate of the original solution by treating with an alcohol vapor and separating out a paste of completely polymerized alcohol soluble vinyl acetate by cooling.

6. Process for producing pastes easily soluble in solvents, especially in ethanol, from completely polymerized vinyl esters insoluble and slightly soluble in alcohols comprising starting from their solutions obtained with a real solvent which immediately dissolves the polymerized vinyl esters, displacing the real solvent of the original solution by an alcohol by blowing through the solution gaseous alcohol at a temperature of at least the boiling point of the alcohol, and adding organic solvents to the separated paste.

7. Process for producing pastes easily soluble in solvents, especially in ethanol, from completely polymerized vinyl esters insoluble and slightly soluble in alcohols, comprising starting from their solutions obtained with a real solvent which immediately dissolves the polymerized vinyl esters, displacing the real solvent of the original solution by an alcohol by blowing through the solution gaseous alcohol at a temperature of at least the boiling point of the alcohol, and separating out a paste of alcohol soluble completely polymerized vinyl esters by cooling.

WILLY O. HERRMANN.
WOLFRAM HAEHNEL.